United States Patent
Grabmaier et al.

(10) Patent No.: US 12,181,684 B2
(45) Date of Patent: Dec. 31, 2024

(54) DEVICE FOR PRECISELY ALIGNING A PROJECTION MODULE RELATIVE TO A PROJECTION SURFACE, METHOD FOR PRODUCING THE DEVICE

(71) Applicant: Robert Bosch GmbH, Stuttgart (DE)

(72) Inventors: Florian Grabmaier, Tuebingen (DE); Joerg Carls, Altdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/496,320

(22) Filed: Oct. 27, 2023

(65) Prior Publication Data

US 2024/0280825 A1 Aug. 22, 2024

(30) Foreign Application Priority Data

Feb. 21, 2023 (DE) ...................... 10 2023 201 496.3

(51) Int. Cl.
*G02B 27/01* (2006.01)
*G02B 27/62* (2006.01)

(52) U.S. Cl.
CPC ......... *G02B 27/0176* (2013.01); *G02B 27/62* (2013.01); *G02B 2027/0178* (2013.01)

(58) Field of Classification Search
CPC ................ G02B 27/0176; G02B 27/62; G02B 2027/0178
See application file for complete search history.

(56) References Cited

U.S. PATENT DOCUMENTS

| | | | | |
|---|---|---|---|---|
| 3,634,676 | A * | 1/1972 | Castellano | F21L 4/00 362/105 |
| 5,276,471 | A * | 1/1994 | Yamauchi | G02C 7/101 351/158 |
| 5,369,415 | A * | 11/1994 | Richard | G02B 27/0172 345/6 |
| 5,543,816 | A * | 8/1996 | Heacock | G02B 13/18 359/630 |
| 5,886,822 | A * | 3/1999 | Spitzer | G02B 27/144 359/633 |
| 6,023,372 | A * | 2/2000 | Spitzer | G02C 11/00 359/630 |
| 6,091,546 | A * | 7/2000 | Spitzer | G02B 27/0172 351/158 |
| 6,204,974 | B1 * | 3/2001 | Spitzer | G02C 11/10 359/633 |

(Continued)

FOREIGN PATENT DOCUMENTS

DE 102018204573 A1 10/2018
WO 2019079894 A1 5/2019

*Primary Examiner* — Benyam Ketema
(74) *Attorney, Agent, or Firm* — NORTON ROSE FULBRIGHT US LLP; Gerard A. Messina

(57) ABSTRACT

A device for precisely aligning a projection module relative to a projection surface. The device includes a bracket and a front. The bracket is designed to support the projection module. The front is designed to support the projection surface. The device further includes a compensating element for precisely aligning the projection module relative to the projection surface. The compensating element produces a firmly bonded connection between the bracket and the front or between the bracket and the projection module. A method for producing the device is also described.

18 Claims, 3 Drawing Sheets

(56) References Cited

U.S. PATENT DOCUMENTS

| | | | | |
|---|---|---|---|---|
| 6,349,001 B1* | 2/2002 | Spitzer | G02C 11/10 | |
| | | | 351/158 | |
| 6,879,443 B2* | 4/2005 | Spitzer | G02B 27/0176 | |
| | | | 359/630 | |
| 7,319,437 B2* | 1/2008 | Yamamoto | G02B 27/0172 | |
| | | | 359/630 | |
| 8,092,011 B2* | 1/2012 | Sugihara | G02B 27/0172 | |
| | | | 351/158 | |
| 8,531,355 B2* | 9/2013 | Maltz | G02B 27/0093 | |
| | | | 455/556.1 | |
| 8,576,143 B1* | 11/2013 | Kelly | G02B 27/017 | |
| | | | 359/630 | |
| 8,760,765 B2* | 6/2014 | Gupta | G02B 27/0172 | |
| | | | 359/630 | |
| 9,897,811 B2* | 2/2018 | Martinez | G02B 27/01 | |
| 10,444,516 B2* | 10/2019 | Eastwood | G02C 5/20 | |
| 11,249,312 B2* | 2/2022 | Cakmakci | G02C 11/10 | |
| 11,415,802 B2* | 8/2022 | Shin | G02B 27/4205 | |
| 11,468,639 B2* | 10/2022 | Nowatzyk | G06F 3/011 | |
| 2002/0171605 A1 | 11/2002 | Kim | G02B 27/0176 | |
| | | | 345/8 | |
| 2007/0070859 A1* | 3/2007 | Hirayama | G02B 27/0172 | |
| | | | 369/112.04 | |
| 2008/0025667 A1* | 1/2008 | Amitai | G02B 6/003 | |
| | | | 385/36 | |
| 2008/0158506 A1* | 7/2008 | Fuziak | G02C 5/146 | |
| | | | 351/158 | |
| 2010/0046070 A1* | 2/2010 | Mukawa | G02B 27/0176 | |
| | | | 359/633 | |
| 2010/0149073 A1* | 6/2010 | Chaum | G02B 27/0075 | |
| | | | 345/8 | |
| 2011/0213664 A1* | 9/2011 | Osterhout | G06F 3/013 | |
| | | | 705/14.58 | |
| 2012/0001833 A1* | 1/2012 | Lindig | G02B 27/017 | |
| | | | 345/8 | |
| 2012/0224260 A1* | 9/2012 | Healy | G02C 5/10 | |
| | | | 359/464 | |
| 2013/0038510 A1* | 2/2013 | Brin | G02B 27/017 | |
| | | | 345/8 | |
| 2014/0253867 A1* | 9/2014 | Jiang | G02C 11/10 | |
| | | | 351/158 | |
| 2016/0187654 A1* | 6/2016 | Border | G02B 27/0172 | |
| | | | 359/630 | |
| 2016/0274361 A1* | 9/2016 | Border | G02B 27/0093 | |
| 2017/0293143 A1* | 10/2017 | Martinez | G02B 27/0172 | |
| 2022/0269088 A1* | 8/2022 | Marchini | G02B 27/0093 | |
| 2024/0019710 A1* | 1/2024 | Marchini | G02B 27/0081 | |

\* cited by examiner

DEVICE FOR PRECISELY ALIGNING A PROJECTION MODULE RELATIVE TO A PROJECTION SURFACE, METHOD FOR PRODUCING THE DEVICE

CROSS REFERENCE

The present application claims the benefit under 35 U.S.C. § 119 of German Patent Application No. DE 10 2023 201 496.3 filed on Feb. 21, 2023, which is expressly incorporated herein by reference in its entirety.

FIELD

The present invention relates to a device for precisely aligning a projection module relative to a projection surface, and to a method for producing the device.

PCT Patent Application No. WO 2019 079 894 A1 describes aspects of projection modules.

SUMMARY

A device according to the present invention provides a precise alignment of a projection module relative to a projection surface. According to an example embodiment of the present invention, the device comprises a bracket, in particular a temple, and a front, in particular an eyeglasses front, wherein the bracket is designed to support the projection module, wherein the front is designed to support the projection surface or a glass, in particular an eyeglass lens, which comprises the projection surface, and wherein the device comprises a compensating element for precisely aligning the projection module relative to the projection surface, which compensating element produces a firmly bonded connection between the bracket and the front or between the bracket and the projection module.

According to an example embodiment of the present invention, a pair of eyeglasses comprising this device has a projection module precisely aligned relative to the projection surface. The compensating element compensates for manufacturing tolerances on the bracket, front, or projection module.

According to an example embodiment of the present invention, on a first side of the compensating element, the compensating element preferably has a contact surface to the bracket, wherein, on a second side opposite to the first side or on a second side of the compensating element adjacent to the first side, the compensating element has a contact surface, in particular to the front or to the projection module, wherein the compensating element is of varying thickness between the contact surfaces, in particular wedge-shaped, preferably designed as a one-dimensional or two-dimensional wedge. Due to its varying thickness, the compensating element compensates for angular deviations which exist on the bracket, front or projection module due to manufacturing tolerances.

Preferably, according to an example embodiment of the present invention, the compensating element is wedge-shaped with a blunt side which substantially has a thickness of 0.3 mm or more than 0.3 mm, in particular 0.4 mm or more than 0.4 mm, 0.5 mm or more than 0.5 mm, or 0.6 mm or more than 0.6 mm, at one end of the blunt side or at both ends of the blunt side. Manufacturing tolerances up to a size corresponding to the respective thickness side are thereby compensated.

According to an example embodiment of the present invention, preferably, the compensating element is wedge-shaped, preferably designed as a one-dimensional or two-dimensional wedge, with an edge which substantially has a thickness of 0.3 mm or less than 0.3 mm, in particular 0.2 mm or less than 0.2 mm, 0.1 mm or less than 0.1 mm, or 0.05 mm or less than 0.05 mm, at one end of the edge or at both ends of the edge. Manufacturing tolerances up to a size corresponding to the respective thickness are thereby compensated.

In one embodiment of the present invention, the bracket or the front or the projection module comprises a receptacle having a surface for contact with the contact surface of the compensating element, wherein, laterally to the surface, the receptacle does not have a stop for limiting a lateral movement of the contact surface or has a gap between a stop, arranged laterally to the surface, for limiting a lateral movement of the contact surface and the compensating element. Due to their varying dimensions, the compensating element and the receptacle compensate for lateral deviations, which exist as a result of manufacturing tolerances on the bracket, front or projection module.

According to an example embodiment of the present invention, preferably, the compensating element comprises in particular light-cured or dual-cured adhesive, or the compensating element consists of in particular light-cured or dual-cured adhesive. The compensation is achieved particularly well via this firmly bonded connection.

According to an example embodiment of the present invention, the compensating element preferably connects a head to a cylindrical sleeve, wherein the head supports the bracket and the sleeve supports the projection module or the front, or wherein the sleeve supports the bracket and the head supports the projection module or the front. The compensating element fixes this ball joint for precise alignment.

In one embodiment of the present invention, the device comprises two compensating elements. As a result, the firmly bonded connection is achieved at two locations.

According to an example embodiment of the present invention, the two compensating elements are preferably arranged, spaced apart from one another, between the bracket and the projection module. As a result, the projection module is held, precisely aligned, by the bracket.

Preferably, according to an example embodiment of the present invention, the device comprises two brackets arranged on opposite sides of the front, wherein one of the two compensating elements is arranged between the one of the two brackets and the front, wherein one of the two compensating elements is arranged between the other of the two brackets and the front. The front is thereby precisely aligned relative to both brackets.

According to an example embodiment of the present invention, a method for producing a device for precisely aligning a projection module relative to a projection surface provides that a compensating element for the firmly bonded connection is arranged between a bracket and a front or a projection module, wherein the projection module is arranged on the bracket, wherein the projection surface is arranged on the front, wherein the bracket or the projection module is aligned in a position relative to the front or the projection surface, and wherein the position is held at least temporarily while the firmly bonded connection is being produced. As a result, the precise alignment is produced particularly simply, in particular in mass production.

Further advantageous embodiments of the present invention can be taken from the following description and the figures.

DETAILED DESCRIPTION OF EXAMPLE EMBODIMENTS

Figure 1A:
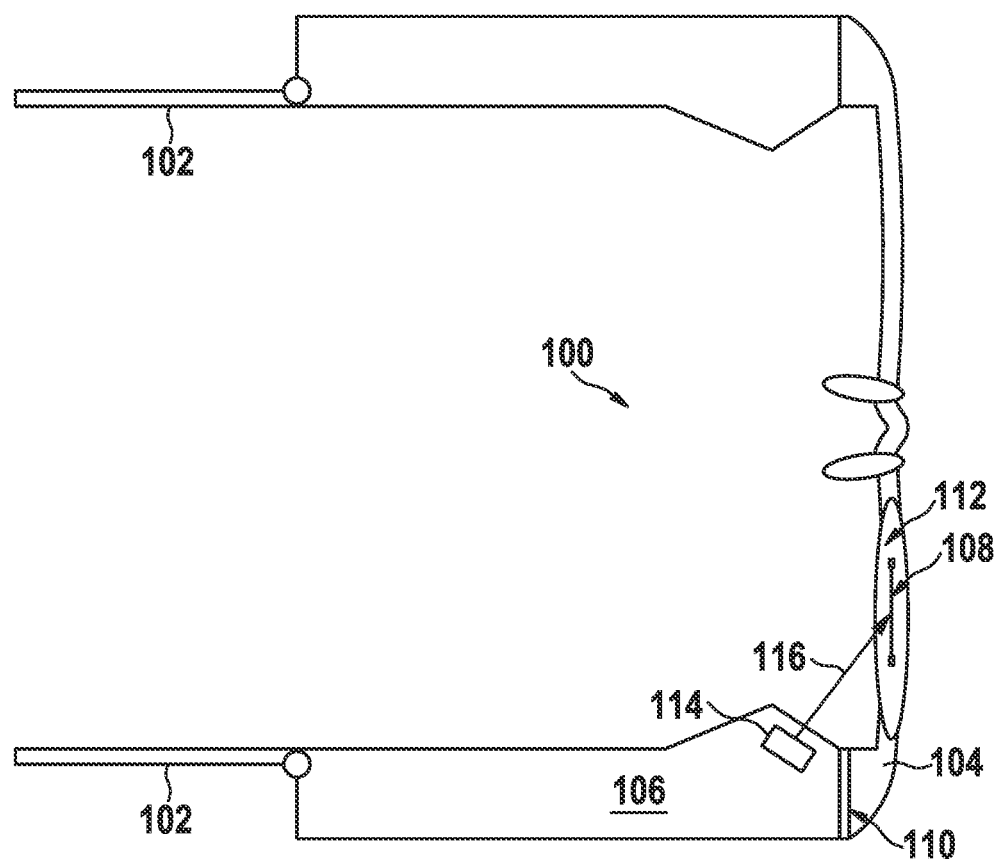
FIG. 1A shows a schematic representation of a first embodiment of a device for precisely aligning a projection module relative to a projection surface, according to the present invention.

FIG. 1A schematically shows a first embodiment of a device 100. The device 100 comprises a bracket 102, in the example a temple, and a front 104, in the example an eyeglasses front.

The device 100 comprises a projection module 106 and a projection surface 108.

The bracket 102 is designed to support the projection module 106. Support in this context means, in particular, that the projection module 106 is attached to the bracket 102 directly, e.g., by means of an adhesive connection, or indirectly, i.e., via an attachment to another element. The front 104 is designed to support the projection surface 108.

The device 100 comprises a compensating element 110 for precisely aligning the projection module 106 relative to the projection surface 108.

The compensating element 110 produces a firmly bonded connection between the bracket 102 and the front 104.

The front 104 is designed to support the projection surface 108. Support in this context means, in particular, that the projection surface 108 is attached to the front 104 directly, e.g., by means of an adhesive connection, or indirectly, i.e., via an attachment to another element.

The projection surface 108 is, for example, a holographic optical element arranged in a body 112, in particular an eyeglass lens. It may also be provided that the projection surface 108 is embedded in or fixed to the body, in the example in the eyeglass lens 112.

The projection module 106 comprises a projector 114 designed to transmit a laser beam 116. The laser beam 116 can, for example, be deflected by micromechanical mirrors at various locations of the projection surface 108. The projection module 106 is precisely aligned relative to the projection surface 108 when the laser beam 116 reaches the various locations of the projection surface 104 with the desired precision.

For this purpose, two degrees of angular freedom and two degrees of translational freedom must be compensated.

In the example, the bracket 102 and the front 104 are parts of a pair of eyeglasses. In the example, a lens of the glasses comprises the holographic optical element 112.

In a pair of eyeglasses, the installation space for the projection module 106 is also limited. The compensating element 110 compensates for tolerances created due to manufacturing tolerances in the production of the bracket 102, the front 104, the projection module 106 and the projection surface 108.

Figure 1B:
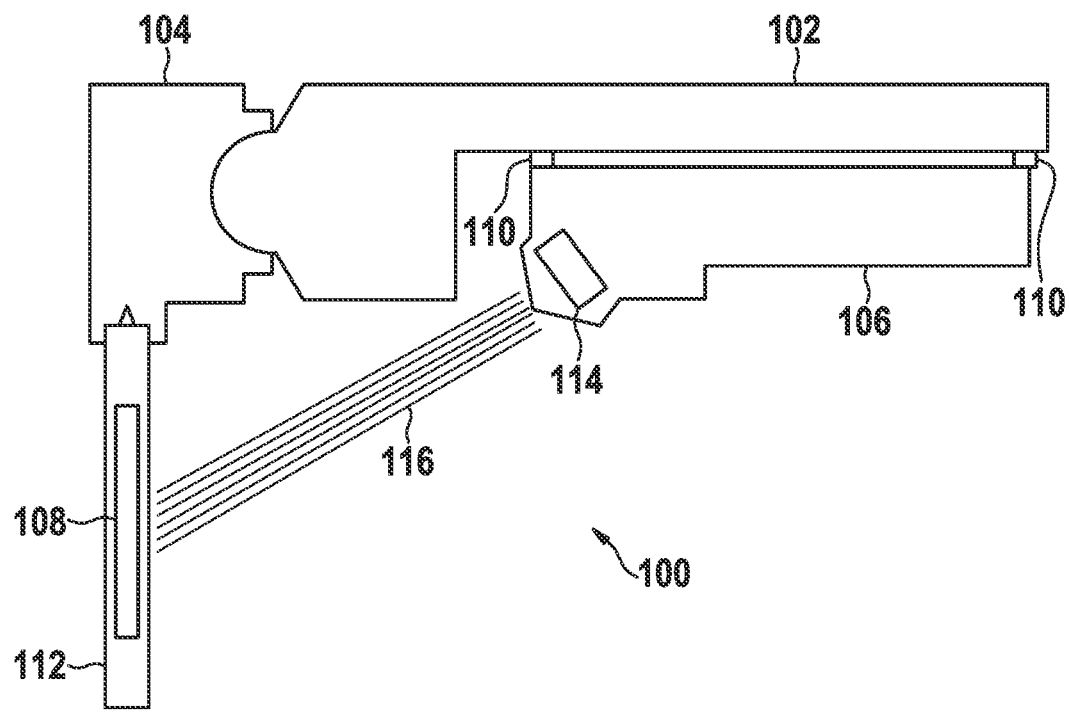
FIG. 1B shows a schematic representation of a first embodiment of a device for precisely aligning a projection module relative to a projection surface, according to the present invention.

FIG. 1B schematically shows a second embodiment of a device 100. In contrast to the first embodiment of the device 100, two compensating elements 110 which are arranged, spaced apart from one another, between the bracket 102 and the projection module 106 produce the firmly bonded connection.

Figure 2:
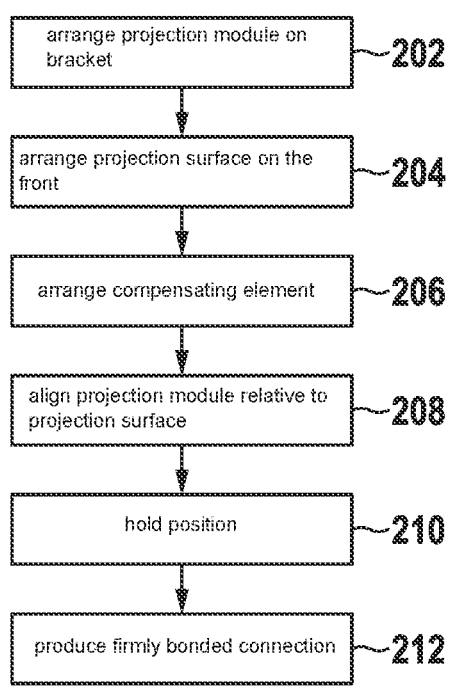
FIG. 2 shows a method for precisely aligning the projection module relative to the projection surface, according to an example embodiment of the present invention.

FIG. 2 shows steps in a method for producing the device 100 for precisely aligning the projection module 106 relative to the projection surface 108.

The method comprises a step 202.

In step 202, the projection module 106 is arranged on the bracket 102.

The method comprises a step 204.

In step 204, the projection surface 108 is arranged on the front 104.

The method comprises a step 206.

In step 206, the compensating element 110 for the firmly bonded connection is arranged between the bracket 102 and the front 104.

It may be provided that the compensating element 110 is arranged between the bracket 102 and the projection module 106.

The method comprises a step 208.

In step 208, the projection module 106 is aligned in a position relative to the projection surface 108 where the projection module 106 is precisely aligned relative to the projection surface 108. The projection module 106 and the projection surface 108 are moved relative to one another.

It may be provided that the projection module 106 is moved and the projection surface 108 is fixed. It may be provided that the projection surface 108 is moved and the projection module 106 is fixed.

It may be provided that the bracket 102 or the front 104 is moved.

The method comprises a step 210.

In step 210, the position is held.

The method comprises a step 212.

In step 212, the firmly bonded connection is produced.

The position is held at least temporarily while the firmly bonded connection is being produced.

Figure 3:
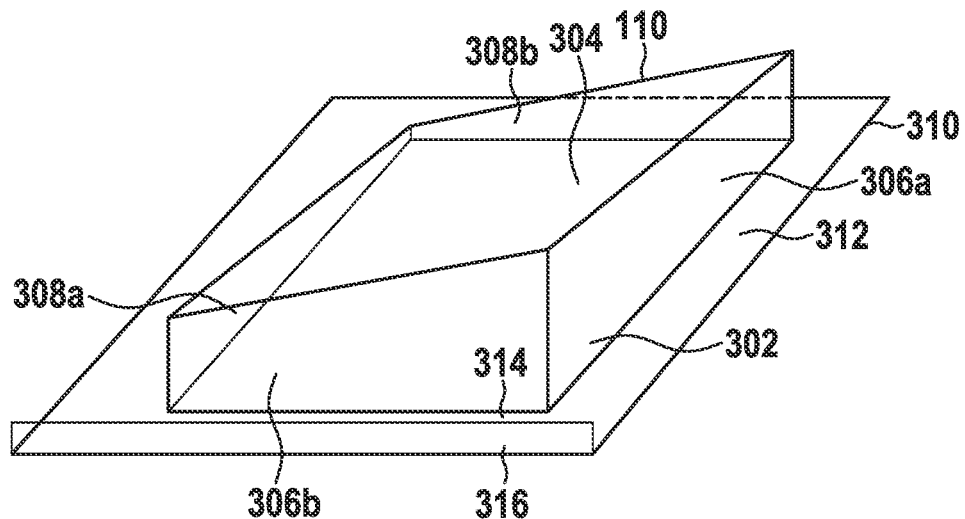
FIG. 3 shows a schematic representation of a first embodiment of a compensating element, according to an example embodiment of the present invention.

FIG. 3 schematically shows a first embodiment of the compensating element 110.

A first side of the compensating element 110 has a contact surface 302 to the bracket 102.

On a second side of the compensating element 110 opposite to the first side, the compensating element 110 has a contact surface 304. It may be provided that the compensating element 110 has the contact surface 304 on a second side adjacent to the first side. This makes it possible to geometrically compensate for the angles.

The compensating element 110 is of varying thickness between the contact surfaces 302, 304.

The compensating element 110 is substantially wedge-shaped, for example. In the example, the compensating element 110 is designed as a two-dimensional wedge. The compensating element 110 may be designed as a one-dimensional wedge.

The two-dimensional wedge is designed with a first blunt side 306a and a first edge 308a opposite to this blunt side 306. The two-dimensional wedge is designed with a second blunt side 306b and a second edge 308b opposite to this blunt side 306b. It may be provided that the two-dimensional wedge is designed with a second blunt side 306b and a second edge 308b adjacent to this blunt side 306b.

The first blunt side 306a is thinner at one end of the first blunt side 306a than at another end of the first blunt side 306a.

The second blunt side 306b is thinner at one end of the second blunt side 306b than at another end of the second blunt side 306b.

It may be provided that the first blunt side 306a or the second blunt side 306b has the same thickness at both ends.

For example, a thickness of one end of the blunt side 306 is 0.3 mm or more than 0.3 mm.

For example, a thickness of one end of the blunt side 306 is 0.4 mm or more than 0.4 mm.

For example, a thickness of one end of the blunt side 306 is 0.5 mm or more than 0.5 mm.

For example, a thickness of one end of the blunt side 306 is 0.6 mm or more than 0.6 mm.

The first edge 308a is thinner at one end of the first edge 308a than at another end of the edge 308. The second edge 308b is thinner at one end of the second edge 308b than at another end of the second edge 308b.

The thin ends of the first edge 308a and of the second edge 308b in the example are equally thin. The thick end of the first edge 308a and the thin end of the second blunt side 306b in the example are equally thick. The thin end of the first blunt side 306a and the thick end of the second edge 308b in the example are equally thick. The thick end of the second blunt side 306b and the thick end of the first blunt side 306a in the example are equally thick.

It may be provided that the edge 308 has the same thickness at both ends.

For example, a thickness of one end of the edge 308 is 0.3 mm or less than 0.3 mm.

For example, a thickness of one end of the edge 308 is 0.2 mm or less than 0.2 mm.

For example, a thickness of one end of the edge 308 is 0.1 mm or less than 0.1 mm.

For example, a thickness of one end of the edge 308 is 0.05 mm or less than 0.05 mm.

The thickness of the compensating element 110 depends on the manufacturing tolerances. The use of the firmly bonded compensating element reduces the installation space required for compensation. In the example, the thinnest compensating element 110 is used, which causes the compensation required for precision.

The bracket 102 or the front 104 or the projection module 106 has a receptacle 310 having a surface 312 for contact with the contact surface 302 of the compensating element 110.

Laterally to the surface 312, the receptacle 310 does not have a stop for limiting a lateral movement of the contact surface.

It may be provided that the surface 312 has a gap 314 between a stop 316, arranged laterally to the surface, for limiting a lateral movement of the contact surface and the compensating element 110.

The compensating element 110 comprises, for example, light-cured or dual-cured adhesive.

The compensating element 110 consists, for example, of light-cured or dual-cured adhesive.

Figure 4:
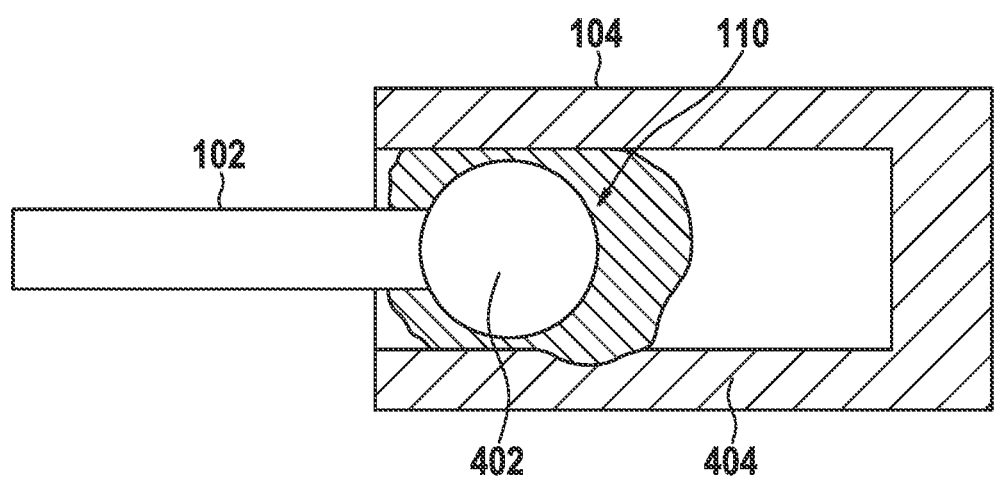
FIG. 4 shows a schematic representation of a second embodiment of the compensating element, according to an example embodiment of the present invention.

FIG. 4 schematically shows a second embodiment of the compensating element 110.

The compensating element 110 according to the second embodiment connects a head 402, in particular a ball head, and a sleeve 404, in particular a cylindrical sleeve.

In the example, it is provided that the head 402 supports the bracket 102 and the sleeve supports the front 104.

It may be provided that the sleeve supports the projection module 106.

It may be provided that the sleeve supports the bracket 102 and the head supports the projection module 106 or the front 104.

It may be provided that the device 100 comprises two compensating elements 110. For example, two substantially wedge-shaped compensating elements, or two sleeves with a respective head, or one wedge-shaped compensating element and one sleeve with a head are provided.

More than two compensating elements 110 may be provided.

For example, the two compensating elements 110 are arranged, spaced apart from one another, between the bracket 102 and the projection module 106.

It may be provided that the device 100 comprises two brackets 102 arranged on opposite sides of the front 104.

For example, one of the two compensating elements 110 is arranged between the one of the two brackets 102 and the front 104.

For example, one of the two compensating elements 110 is arranged between the other of the two brackets 102 and the front 104.

What is claimed is:

1. A device for precisely aligning a projection module relative to a projection surface, comprising:
   a bracket and a front, wherein the bracket is configured to support the projection module, and the front is configured to support the projection surface or an eyeglass lens which includes the projection surface; and
   a compensating element configured to precisely align the projection module relative to the projection surface, the compensating element producing a firmly bonded connection between the bracket and the front or between the bracket and the projection module;
   wherein the compensating element connects a head to a cylindrical sleeve.

2. The device as recited in claim 1, wherein the bracket is a temple, and wherein the front is an eyeglass front.

3. The device according to claim 1, wherein, on a first side of the compensating element, the compensating element has a contact surface to the bracket, wherein, on a second side opposite to the first side or on a second side of the compensating element adjacent to the first side, the compensating element has a contact surface to the front or to the projection module, wherein the compensating element is of varying thickness between: (i) the contact surface to the bracket, and (ii) the contact surface to the front or to the projection module, and wherein the compensating element is wedge-shaped.

4. The device according to claim 3, wherein the compensating element is in the shape of a one-dimensional or two-dimensional wedge.

5. The device according to claim 1, wherein the compensating element is wedge-shaped with a blunt side which substantially has a thickness of 0.3 mm or more than 0.3 mm, at one end of the blunt side or at both ends of the blunt side.

6. The device according to claim 1, wherein the compensating element is wedge-shaped, with an edge which substantially has a thickness of 0.3 mm or less than 0.3 mm, at one end of the edge or at both ends of the edge.

7. The device according to claim 1, wherein: (i) the bracket or the front or the projection module has a receptacle having a surface for contact to a contact surface of the compensating element, wherein, laterally to the surface, (ii) the receptacle does not have a stop for limiting a lateral movement of the contact surface, or has a gap between a stop, arranged laterally to the surface, for limiting a lateral movement of the contact surface and the compensating element.

8. The device according to claim 1, wherein: (i) the compensating element includes light-cured or dual-cured adhesive, or (ii) consists of light-cured or dual-cured adhesive.

9. The device according to claim 1, and wherein: (i) the head supports the bracket and the sleeve supports the projection module or the front, or (ii) the sleeve supports the bracket and the head supports the projection module or the front.

10. The device according to claim 1, wherein the device includes two compensating elements.

11. The device according to claim 10, wherein the two compensating elements are arranged, spaced apart from one another, between the bracket and the projection module.

12. The device according to claim 10, wherein the device includes two brackets arranged on opposite sides of the front, wherein one of the two compensating elements is arranged between one of the two brackets and the front, wherein one of the two compensating elements is arranged between the other of the two brackets and the front.

13. A method for producing a device for precisely aligning a projection module relative to a projection surface, the method comprising:

arranging a compensating element for a firmly bonded connection between: (i) a bracket, and (ii) a front or a projection module;
arranging the projection module on the bracket;
arranging the projection surface on the front;
aligning the bracket or the projection module in a position relative to the front or to the projection surface; and
holding the position at least temporarily while the firmly bonded connection is being produced;
wherein the compensating element connects a head to a cylindrical sleeve.

14. The method according to claim 13, wherein: (i) the head supports the bracket and the sleeve supports the projection module or the front, or (ii) the sleeve supports the bracket and the head supports the projection module or the front.

15. The method according to claim 13, wherein the head supports the bracket and the sleeve supports the projection module or the front.

16. The method according to claim 13, wherein the sleeve supports the bracket and the head supports the projection module or the front.

17. The device according to claim 1, wherein the head supports the bracket and the sleeve supports the projection module or the front.

18. The device according to claim 1, wherein the sleeve supports the bracket and the head supports the projection module or the front.

\* \* \* \* \*